United States Patent [19]

Beck et al.

[11] Patent Number: 4,947,017
[45] Date of Patent: Aug. 7, 1990

[54] COMPOSITE WELD GUN AND METHOD OF MAKING SAME

[75] Inventors: Scott A. Beck, Fenton; Harry E. Messerly, Grand Blanc, both of Mich.

[73] Assignee: General Motors Corporation, Detroit, Mich.

[21] Appl. No.: 331,719

[22] Filed: Apr. 3, 1989

[51] Int. Cl.⁵ .............................................. B23K 11/30
[52] U.S. Cl. ................................................. 219/86.25
[58] Field of Search ............... 219/89, 86.25; 428/902; 138/137

[56] References Cited

U.S. PATENT DOCUMENTS

| | | | |
|---|---|---|---|
| 1,425,148 | 8/1922 | Subers | 138/137 |
| 3,021,417 | 2/1962 | Halberstadt | 219/89 |
| 3,523,172 | 8/1970 | Wilbur | 219/89 |
| 4,214,932 | 7/1980 | Van Auken | 428/902 |
| 4,550,236 | 10/1985 | Nakadate et al. | 219/86.25 |

Primary Examiner—Clifford C. Shaw
Attorney, Agent, or Firm—C. R. Meland

[57] ABSTRACT

Structural elements of weld guns are made of composites for strength, low weight and long life. Anisotropic strength structures are fabricated by making a hollow form and applying layers of carbon fabric and unidirectional tape which are aligned with the forces developed within the structure to withstand shear, tension and compression. A tough abrasion resistant fabric such as an aramid fabric is applied as a protective covering. A resin binder unites the composite structure.

6 Claims, 2 Drawing Sheets

COMPOSITE WELD GUN AND METHOD OF MAKING SAME

FIELD OF THE INVENTION

This invention relates to a composite weld gun and a method of making such a gun.

BACKGROUND OF THE INVENTION

Resistance welding or spot welding is commonly applied to the assembly of automotive bodies and other products. The guns are often large to accommodate large sheets of steel requiring welds far from a convenient access location. These guns are generally held and manipulated by robots or held by hoists and manually manipulated. Traditionally the guns are made of strong metal structural elements to withstand the welding forces that must be applied to the weld electrodes. Consequently the guns may have very large mass which is difficult for a robot or other machine to manage with consistent positioning accuracy over an extended period of time due to wear in the robot wrist, for example. The heavy guns tend to have lifetimes limited by fatigue.

There have been some attempts to make light weight weld guns from composite materials which are strong but not as heavy as the traditional metal structures. Generally such structures have been formed by packing resin impregnated fibers or fabrics into a mold with random fiber orientation and curing the resin to obtain an isotropic product, i.e., a product which has no preferential load direction to withstand stress. Such devices have achieved light weight and dimensional stability but have exhibited short lives. Further, in order to fabricate such a device an expensive mold must be made.

SUMMARY OF THE INVENTION

It is therefore an object of the invention to provide a composite weld gun having long life as well as high strength and light weight. It is another object to provide a method of making such a composite weld gun. It is a further object to provide a method of making such a weld gun without a mold.

The invention is carried out by a weld gun having at least one structural element having high strength and light weight, said element comprising: a hollow core, and a composite jacket on said core comprising at least one layer of high strength carbon fabric, unidirectional high strength carbon fibers in areas of tension or compression, an abrasion resistant outer fabric over the carbon covering, and a resin for binding the composite, whereby the element has both high strength and low weight as well as durability.

The invention is also carried out by the method of making a weld gun having at least a composite structural member, weld electrodes and an actuator, comprising the steps of: forming a core having the essential shape of the structural member, wrapping the core with a carbon fabric with the fabric direction at an angle to withstand shear forces in the member, applying unidirectional carbon fiber to regions of the member to withstand tension and compression forces in the member, applying a protective fabric over the carbon fabric and fibers, impregnating the fabrics and the fibers with resin, curing the resin to form the structural element, and assembling weld electrodes and a weld actuator to the structural member.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The ensuing description is primarily directed to a weld gun having a composite frame supporting weld electrodes and an actuator and the method of making the composite frame; however the invention is equally applicable to weld guns having other structural parts such as articulated jaws which are made of composites. In every case the guns have specific properties including high strength and stiffness which meets the requirements for tip deflection, torsional misalignment, and flexural stress and also is resistant to heat and humidity, impact and abrasion, and corrosion. The description is also directed to a very large weld gun for robot or other machine usage but smaller manually controlled guns also benefit from the principles of the invention. In each case the advantages to be gained are not only light weight but also low initial cost, long life and, in some cases, the elimination of expensive support equipment by reducing the number of weld guns needed for a job.

Figure 1:
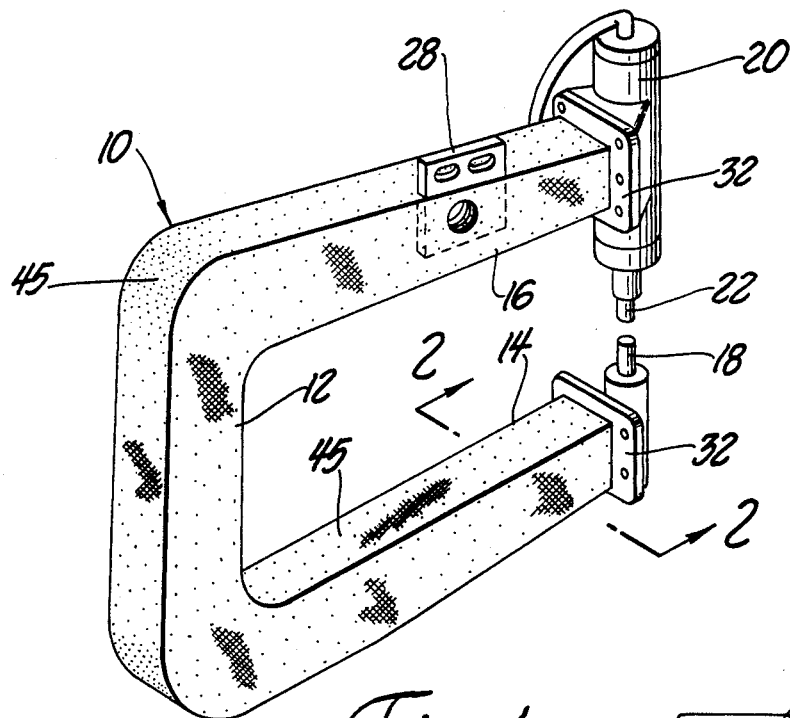
FIG. 1 is a perspective view of a weld gun according to the invention.

FIG. 1 shows a weld gun having a U-shaped frame 10 having a base section 12 and a pair of parallel arms 14 and 16 extending from the base. The lower arm 14 carries an electrode 18 while the upper arm 16 supports a direct acting cylinder or actuator 20 which carries an upper weld electrode 22 in alignment with the lower electrode 18. The frame 10 is hollow and contains coolant hoses 24 and an electrical cable 26, shown in section in FIG. 2. A mounting bracket 28 secured to the side of the upper arm 16 provide an attachment point for coupling to a robot or hoist. In use the frame must limit deflection of the electrodes 18, 22 when welding force is applied and prevent torsion of the arms 14, 16 to maintain alignment of the electrodes 18, 22. The reach of the gun as established by the arm length must be large enough to span large sheets of material. The arms may be, for example, 36 inches long or even greater than 50 inches long, while the distance between the arms is on the order of 18 or 24 inches.

The frame 10 is fabricated of non-magnetic material and is based on a form or core 30. The requirements of the form or core are that it provide a carrier for applying the composite material and that the resultant frame or other element be non-magnetic and be hollow to accommodate hoses and cables. A hollow aluminum form serves this purpose but contributes little to the structural strength of the frame. Stainless steel forms are also used and these do contribute to the structural strength. Other forms may be used such as a polymer foam which is melted or dissolved after the composite structure is formed to leave a hollow within the composite.

Figure 4A:
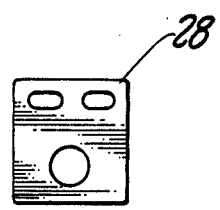
FIGS. 4a and 4b are views of mounting brackets and end fittings, for attachment to the core of FIG. 3, FIGS. 5 and 6 are views of the weld gun during different steps of fabrication to illustrate the process of making the gun, and FIG. 7 a broken away view of a portion of the gun showing the application of layers of fabric to the form, according to the invention.
Figure 4B:
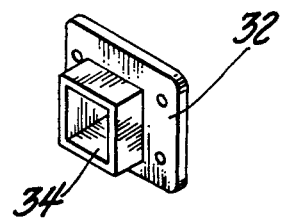
Figure 3:
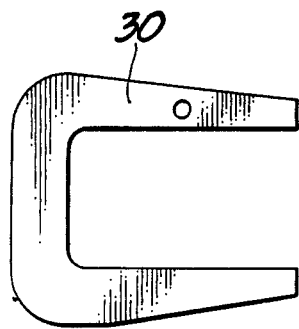
FIG. 3 is a side view of a form for making the weld gun of FIG. 1.
Figure 5:
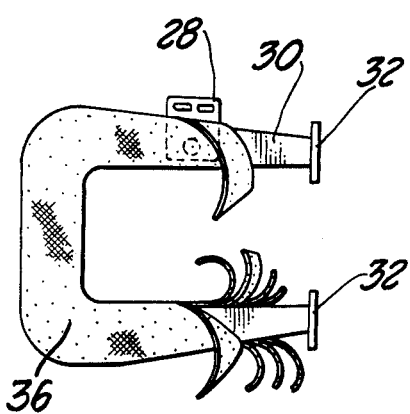
Figure 6:
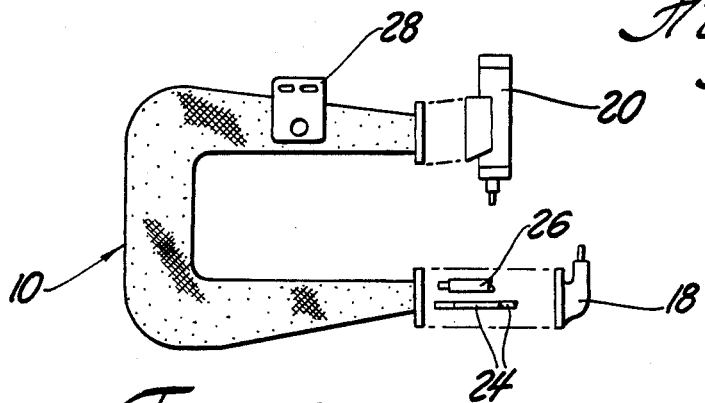

As an example, a hollow aluminum form or core 30 (FIG. 3) is formed by welding together plates shaped to approximate the desired shape of the frame 10 or by bending aluminum tubing on a mandrel to the desired shape. The mounting bracket 28 (FIG. 4a) and end brackets 32 (FIG. 4b) are formed of aluminum and welded to the form 30. The end brackets 32 have protruding box sections 34 which are inserted into the hollow ends of the form 30. As indicated generally at FIG. 5 composite material 36 is applied to the outer surface of the aluminum form and then cured to complete the frame. Finally, as shown in FIG. 6, the lines 24 and cable 26 are inserted into the frame 10 and the actuator 20 and electrode 22 are secured to the bracket 32 on the upper arm and the electrode 18 is secured to the lower arm bracket.

Figure 7:
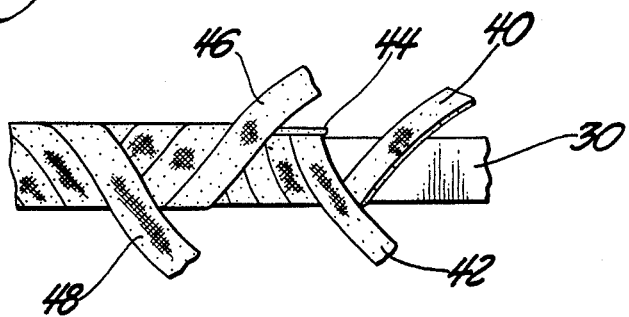

The procedure and materials for the composite 36 are selected to provide the necessary strength and endurance for the weld gun. By using combinations of fiber types and orientations, properties of the structure can be tailored to meet specifications. Fabrics and unidirectional fibers are used. A critical design principle is that the fiber and fabric direction provides anisotropic strength and must be applied to the gun structure in directions to withstand the forces developed in the gun. A high strength carbon fiber is one preferred material and is referred to here as carbon. The high strength carbon has a tensile modulus of 30 to 35 million psi and has a reasonably low cost in contrast to graphite which has a higher modulus and a higher cost. Other fibers are also used. Before application to the form, they are impregnated with a resin. Epoxy has been proven to be a good choice for the resin, although a polyester or vinylester resin may be used. The fabrics are spiral-wrapped on the form in the manner of surgical bandages while the unidirectional fiber or tape is generally laid in the direction of a tensile or compressive force. This arrangement is illustrated in FIG. 7.

First, a layer of plain weave glass fiber fabric 40 of a minimum of 6 oz./square yard areal weight is wrapped directly on the form 30 to separate the carbon fabric from the aluminum structure and prevent potential galvanic corrosion activity. The glass fabric is oriented at 45 degrees to allow it to carry shear loads in the vertical flats of the structure.

Next, three layers of carbon material are applied. One layer of carbon fabric 42 is laid over the glass layer and will represent a minimum of 0.040 inch thick consolidated composite. The 45 degree orientation is critical for carrying shear loads of the beam vertical flats under tip deflection conditions and for giving torsional stiffness to the gun structure. Then a unidirectional layer of carbon fiber tape 44 of a thickness determined by tip deflection analysis, say 0.120 inch, is applied along both the tension and compression faces 45 of the U-shaped core. This laminate will provide stiffness and strength in the structure under tip deflection conditions. Depending of tip deflection requirements, local build-up of unidirectional material in the highly stressed radii of the structure may also be desirable. A second layer of carbon fabric 46, a minimum of 0.040 inch thick, is applied at 45 degrees to encapsulate the unidirectional fiber and again to provide shear strength in the arms and to control torsional deflection. A final layer 48 of an abrasion resistant, impact resistant and tough material provides a skin over the frame. An aramid fabric such as "Kevlar" (trademark) at least 0.040 inch thick is applied at 45 degrees over the second layer of carbon fabric. While this will contribute to strength, its primary purpose is to protect the other fibers from damage by sheet metal edges and general impact.

The several layers are compacted onto the core by the technique of vacuum bagging as described in "Handbook of Composites", Lubin, 1982, pp 368-378, which is incorporated herein by reference. The uncured composite assembly is covered by a release film, a porous bleeder/breather blanket, and a bagging film which is sealed to form an air tight bag and then the air is evacuated. The ambient air pressure then compresses the frame to remove any air pockets in the composite and compact the composite material against the form. The assembly is cured at a temperature required by the particular resin used to impregnate the fabric and fibers. Typically the cure temperature is 250 to 350 degrees F. and the cure is completed in 2 or 3 hours.

Figure 2:
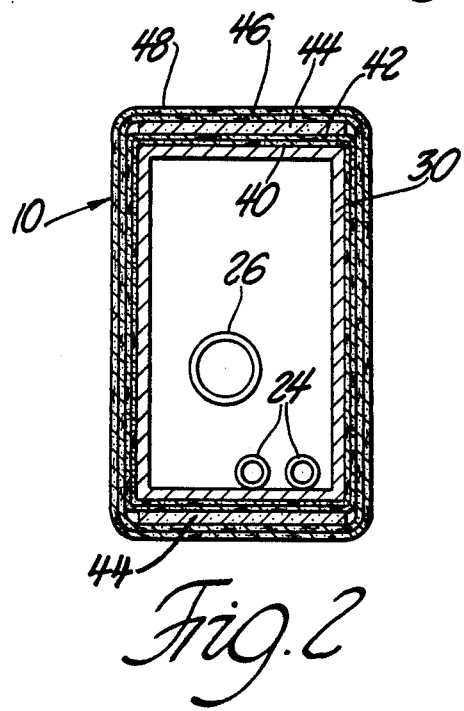
FIG. 2 is a cross section view of the weld gun taken along line 2—2 of FIG. 1.

A composite weld gun frame like that of FIG. 1 having a 0.1 inch thick aluminum core, arms 36 inches long spaced 18 inches apart, having a section as in FIG. 2 of about 3 by 5 inches and covered in accordance with the above described process weighed 29 pounds. This was made as a replacement for a copper-beryllium frame weighing 200 pounds. Both guns meet the same specifications. The composite gun is not only stronger and lighter but has a much longer life. The life of the copper-beryllium gun is limited by fatigue. The composite gun is designed with an ultimate strength ten times the applied loads so that fatigue does not limit the life of the gun. The light gun reduces wear on robots and allows smaller robots to be used or allows larger guns to be handled by robots. A weld gun having a long reach can do the job of two smaller guns thereby reducing the number of guns and the number of robots needed.

The embodiments of the invention in which an exclusive property or privilege is claimed are defined as follows:

1. A weld gun having at least one structural element that is adapted to support a welding electrode, said element comprising:
    a hollow core, and
    a composite jacket on said core comprising at least one layer of carbon fabric, unidirectional carbon fibers in areas of tension or compression, an abrasion resistant outer fabric over the carbon covering, and a resin for binding the composite.

2. A weld gun having at least one structural element that is adapted to support a welding electrode, said element comprising:
    a hollow metal core, and
    a composite jacket on said core comprising a layer of electrical insulating fabric adjacent the core, at least one layer of carbon fabric over the insulating material, a layer of unidirectional carbon fibers, an outer protective cover of tough fabric, and a resin for binding the layers together, the fabric and the fibers being oriented in directions to withstand forces applied to the element.

3. A weld gun having electrode means and a U-shaped frame having a base member and generally parallel arm members supporting the electrode means, the frame comprising:

a hollow metal U-shaped core having surfaces subject to tension and compression when under load, a layer of fiberglass fabric on the metal core, first and second layers of carbon fabric over the fiberglass fabric, bundles of unidirectional carbon fibers between the said first and second layers and over the surfaces subject to tension and compression for bearing tensile and compressive forces, a protective covering of fabric over the carbon fabric, and a resin binder consolidating the fabrics, fibers and core.

4. The invention as defined in claim 3 wherein the layers of fiberglass and carbon fabric are arranged with their fibers running diagonally with respect to the underlying core members.

5. The method of making a weld gun having at least a composite structural member, weld electrodes and an actuator, comprising the steps of:

forming a core having the essential shape of the structural member, wrapping the core with a carbon fabric with the fabric direction at an angle to withstand shear forces in the member, applying unidirectional carbon fiber to regions of the member to withstand tension and compression forces in the member, applying a protective fabric over the carbon fabric and fibers, impregnating the fabrics and the fibers with resin, curing the resin to form the structural member, and assembling weld electrodes and a weld actuator to the structural member 6. The method of forming a composite structural element for a weld gun comprising the steps of:

forming a hollow metal core having the essential shape of the structural member, wrapping the core with fiberglass fabric, wrapping a first layer of carbon fabric over the fiberglass fabric, applying unidirectional carbon fiber to regions of the member to withstand tension compression forces in the member, wrapping a second layer of carbon fabric over the unidirectional fiber, applying a protective fabric over the carbon fabric and fibers, each layer of fabric being impregnated with resin and being applied with the fabric direction at an angle to withstand shear forces in the member, and curing the resin to form the structural element.

* * * * *